Oct. 4, 1949.   E. CRAIG   2,483,574
AUXILIARY WHEEL FOR MOTOR VEHICLES OR THE LIKE
Filed Jan. 19, 1946   2 Sheets-Sheet 1
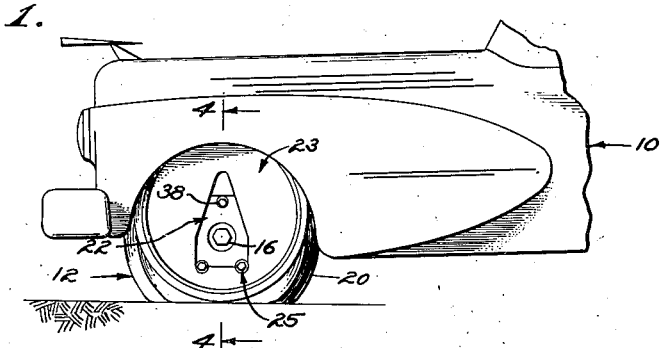
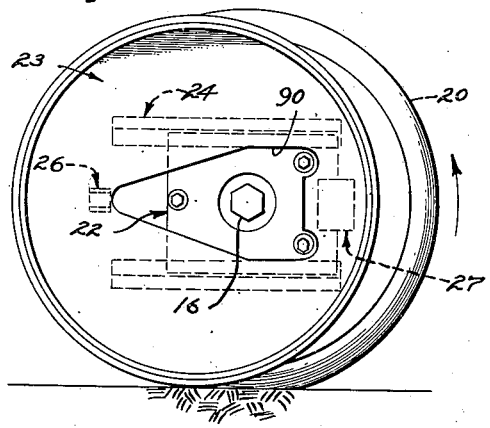
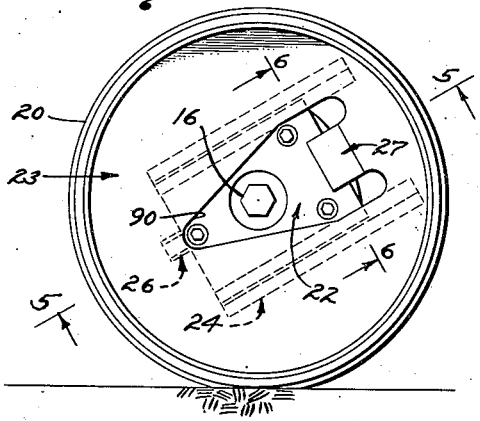
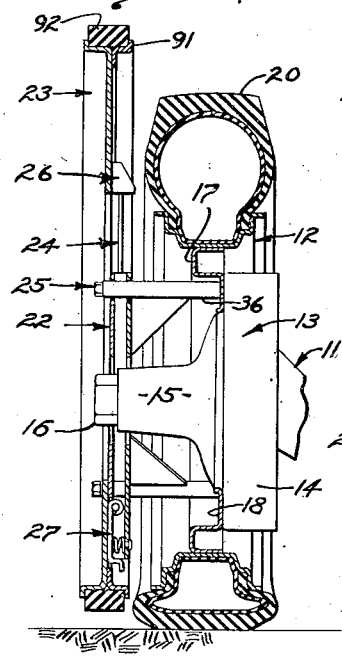
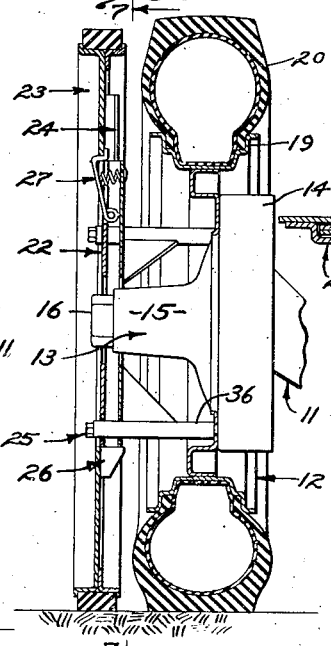
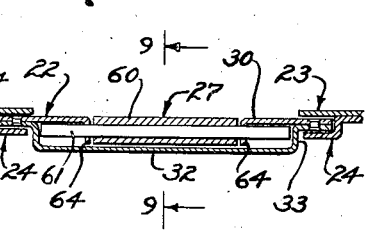
INVENTOR.
Edward Craig
BY
Attorney

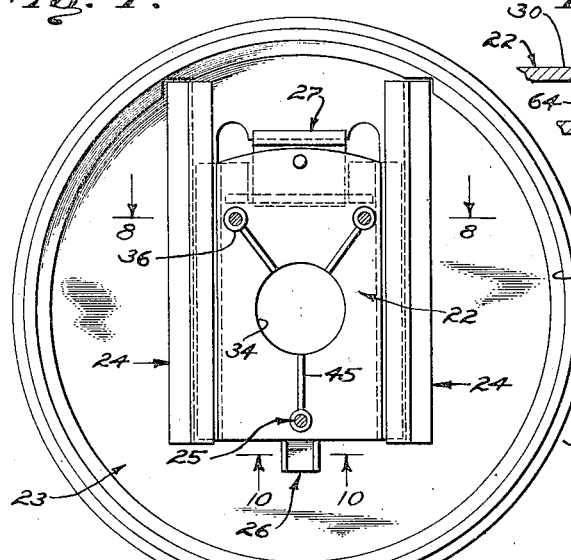

Patented Oct. 4, 1949

2,483,574

UNITED STATES PATENT OFFICE 2,483,574

AUXILIARY WHEEL FOR MOTOR VEHICLES OR THE LIKE

Edward Craig, Brea, Calif.

Application January 19, 1946, Serial No. 642,271

9 Claims. (Cl. 301—38)

This invention has to do with an auxiliary wheel for motor vehicles or the like, it being a general object of the invention to provide a wheel construction to be used as emergency equipment upon failure of a vehicle tire, such for example as the pneumatic tire of the usual motor vehicle.

The usual motor vehicle, for example the usual passenger car or commercial car, is equipped with pneumatic tires and such tires are of such size that the vehicle is rendered difficult to operate when a tire is deflated. Furthermore, it is injurious to a pneumatic tire to operate it when deflated. Because of factors such as those mentioned it is common for the operator of a motor vehicle to carry a spare tire or spare wheel equipped with a tire and to also carry a jack so that when a tire becomes deflated it can be replaced by jacking up the vehicle and replacing the tire or the wheel on which the deflated tire is mounted. Because of the manner in which most motor vehicles are constructed it is usually difficult to operate a jack for the purpose above outlined, and under the most favorable conditions such operation is time consuming and is a dirty, disagreeable operation.

It is a general object of this invention to provide an auxiliary wheel for a motor vehicle or the like applicable to a vehicle where a tire is deflated, so that by a very simple manipulation the vehicle is brought to a position where it is supported by the auxiliary wheel making it possible to operate the vehicle within reasonable limits in spite of the deflated condition of the defective tire, and without danger of injury to the deflated tire.

Another object of my present invention is to provide an auxiliary wheel of the general character hereinabove referred to which involves few simple, inexpensive parts, making the structure commercially practical.

It is a further object of my present invention to provide an auxiliary wheel of the general character referred to which is very simple to apply to a motor vehicle and which can be applied without reaching under the vehicle or performing operations that are inconvenient or which soil the hands.

It is a further object of my present invention to provide an auxiliary wheel of the general character referred to which, in its preferred form, is automatic in action or operation so that after it has been applied to the motor vehicle it is merely necessary for the driver of the vehicle to drive the vehicle forward or backward in order to cause the vehicle to be lifted at the defective tire and to be supported by the auxiliary wheel so that it can be operated to a point where the necessary repair can be made.

The various objects and features of my invention will be fully understood from the following detailed description of typical preferred forms and applications of the invention, throughout which description reference is made to the accompanying drawings, in which:

Fig. 1 is a side elevation of the forward end portion of a typical motor vehicle showing a front wheel having its tire deflated and showing the auxiliary wheel of the present invention applied ready for operation to a position to carry the vehicle in place of the deflated wheel. Fig 2 is an enlarged view of the vehicle wheel shown in Fig. 1 showing it rotated to a position where the vehicle has been lifted by the auxiliary wheel to a position to be carried without relying upon the defective vehicle tire, the other parts of the motor vehicle having been removed for clarity of illustration. Fig. 3 is a view similar to Fig. 2 showing the parts moved ahead or in a more advanced position so that the auxiliary wheel has been fully operated and is carrying the vehicle at the defective tire for operation to a point where repair can be made. Fig. 4 is an enlarged detailed sectional view taken as indicated by line 4—4 on Fig. 1. Fig. 5 is an enlarged detailed sectional view taken as indicated by line 5—5 on Fig. 3. Fig. 6 is an enlarged detailed sectional view taken as indicated by line 6—6 on Fig. 3. Fig. 7 is a view of the auxiliary wheel shown apart from the vehicle and showing the structure viewed as indicated by line 7—7 on Fig. 5. Fig. 8 is an enlarged detailed sectional view taken as indicated by line 8—8 on Fig. 7. Fig. 9 is an enlarged detailed sectional view taken as indicated by line 9—9 on Fig. 6. Fig. 10 is an enlarged detailed sectional view taken as indicated by line 10—10 on Fig. 7, and Fig. 11 is an enlarged view of the auxiliary wheel of the present invention viewed in the position that it is shown in Fig. 1, but showing it apart from the motor vehicle and showing a modified form of construction that can be used in carrying out the invention.

The auxiliary wheel that I have provided can be used, generally, on motor vehicles and is particularly useful on vehicles equipped with pneumatic tires. For purpose of example I have, in Fig. 1 of the drawings, shown the forward end portion of a conventional passenger car and I will, in describing a typical application of the invention, refer to details of construction which may be considered typical of those found in the ordinary passenger car or passenger automobile. It is to be understood that the broader principles of my invention are not to be considered limited by such specific reference, and that in carrying out the invention changes can be made as motor vehicle construction requires.

The vehicle illustrated in the drawings involves, generally, a body 10, and it has a supporting axle 11 carrying a wheel 12. In accordance with usual motor vehicle construction the wheel 12 is mounted on the axle 11 through an assembly that I will refer to as a hub assembly 13. The hub assembly involves, generally, a brake drum 14 and an outwardly projecting bearing housing 15 at the outer end of which there is a grease cap 16. The motor vehicle wheel 12 shown in the drawings is of the metal disc type involving, generally, a body portion 17 in the form of a disc having an inwardly projecting mounting flange 18 and an outer rim 19 that carries the usual pneumatic tire 20. In practice the usual motor vehicle wheel such as I have referred to has the mounting flange 18, substantially as shown in the drawings, and it is common that such flange be secured to the outer side of the brake drum 14 or a corresponding part of the hub assembly 13. Various constructions or fastening means are employed for connecting the wheel flange to the hub assembly. For example, in some cases studs are provided on the hub assembly and nuts are applied to the studs to hold the wheel flange in place, whereas in other cases bolts are passed through the wheel flange and are received in the hub assembly. The structure shown in the drawings involves the latter type of construction, the hub assembly having threaded openings 21 designed to receive bolts which have heads that engage the flange 18 to hold it against the outer side of the hub assembly. The usual construction involves a multiplicity of such retaining bolts or fastening devices, it being common to provide five or more such fasteners in connection with each wheel.

The auxiliary wheel that I have provided is designed for application to the hub assembly 13 and is to be used when the vehicle tire 20 is deflated for any reason whatsoever. The auxiliary wheel involves two principal sections, a hub section 22 and a wheel section 23, means 24 shiftably connecting the sections 22 and 23 between a position where the wheel section is eccentric relative to the hub section and a position where the wheel section is concentric with the hub section, means 25 for attaching the hub section 22 to a hub assembly 13 or the like to be concentric therewith, stop means 26 limiting relative movement between the sections 22 and 23, and a latch 27 releasably holding the sections in concentric relation upon their being moved thereto.

The hub section 22 may be varied considerably in form and construction. A simple form of hub section involves a flat hub plate 30 adapted to be mounted immediately outside of the tire 20 in a plane normal to the axis of the wheel 12. The plate 30, as shown in the drawings, preferably has a central opening 31 which serves to lighten the structure and also provides accommodation for a cup 16 or other part of the vehicle structure that may project to intersect the plane of the hub plate.

The hub section 22 preferably includes, in addition to the plate 30 which is the principal part of this element, a brace or stiffener which may be in the form of a cupped plate 32 having marginal flanges 33 attached to the sides of the plate 30, preferably the inner side of the plate 30 as shown in Fig. 8 of the drawings. Where a stiffener is employed and it is such as to extend across the back of the plate 30, as I have shown in the drawings, it is preferred to provide such stiffener with an opening 34 to register with the opening 31 in the plate 30.

The mounting means 25 that I have provided for mounting the hub plate section 22 on a hub assembly 13 may be varied slightly as circumstances require. In the case of the usual motor car construction such as I have shown in the drawings a plurality of fastening devices is spaced around the center of the plate 30 and such devices project from the plate to connect to the hub assembly 13. In the particular case illustrated I show three fastening devices constituting the means 25 and these devices are spaced apart in a manner to be accommodated by structure of the wheel assembly normally accommodating three of five fastening devices employed for securing the wheel 12 to the hub assembly 13. Since the structure illustrated is to accommodate bolts for fastening the wheel to the hub assembly I provide bolts for fastening the hub section 22 to the hub assembly 13.

Each bolt unit of the means 25 involves, generally a bolt guide 36 and a bolt carried by the guide which bolt has a shank 37 slidably carried by the guide, a head 38 on the outer end of the shank and on the outer side of the plate 30, and a threaded end 39 to be received in one of the threaded openings 21 of the hub assembly 13. It is also desirable to provide means for retaining the bolt in connection with the bolt holder to prevent separation of these parts. In the case illustrated I show the bolt shank with a reduced portion 40 and a retaining pin 41 is carried by the holder and extends into the opening formed by the reduced part. Through this construction the shank 37 is free to rotate and has the necessary longitudinal movement in the holder. The holder 36 is a simple tubular part secured to the hub section 22. In the case illustrated the tubular holder 36 is permanently connected to both the plate 30 and the stiffener 32 as by welding 44, and braces 45 are provided between the holders 36 and the stiffener 32.

In using the construction just described three of the fastening means employed to hold the wheel flange 18 to the hub unit 13 are removed and the hub section 22 of the auxiliary wheel is arranged in the desired position immediately outside the tire 20 and concentric with the hub unit, whereupon the bolts are operated so that their threaded parts 39 are made fast in the openings 21 thus clamping the plate 30 rigidly in operating position.

The means 24 provided to shiftably connect the sections 22 and 23 is preferably such as to allow the sections to slide or reciprocate relative to each other. In the particular construction illustrated in the drawings spaced parallel guides are carried by one section of the auxiliary wheel to carry corresponding flange portions of the other section. In the case illustrated the guides are applied to the inner side of the wheel section 23 and the plate 30 is made rectangular so that it has oppositely disposed side flange portions 46 which are parallel with each other and which slidably operate in the guides. The guides may be formed by S-shaped brackets 50 made fast to the inner side of the wheel section 23 and the flange or marginal portions of the plate 30 that are held in the guides may be reinforced or stiffened by flanges 51 projecting from the stiffener 32, which parts 51 are permanently attached to the flange parts 46 by rivets 55 or other suitable means. The guides just described as formed by the brackets 50 are located at opposite sides of the center of the wheel section and are opposed or faced toward each other so that the hub plate 30 is carried between them and is shiftable relative to the wheel section between a position where the sections are eccentric to one another as shown in Figs. 1 and 2, and a position where they are concentric, as shown in Fig. 3. The amount of movement provided between these two positions is such as to make it possible to apply the assembled sections 22 and 23 to the hub unit 13 when the tire 20 is deflated, as shown in Fig. 1, and thereafter move the sections relative to each other so that the hub unit 13 is lifted to relieve the tire 20 of working pressures which may be to lift it clear of the ground or to a normal running position, as may be desired.

The latch means 27 operates to latch or releasably secure the sections 22 and 23 in the concentric position upon their being moved thereto. This means may include, generally, a latch carried by one of the sections to cooperate with a shoulder on the other of the sections. In the case illustrated I provide a latch 60 carried on a pivot pin 61 and normally urged by a spring 62 to cooperate with a shoulder 63. The pin 61 is shown carried by suitable ears 64 projecting from the plate 30 and the shoulder 63 is formed on the wheel section. A stop lug 66 is provided on the latch to limit its outward movement and in the preferred construction, as shown in Fig. 6, the pivot pin 61 is confined in operating position by the flanges 33 of the stiffener 32.

The wheel section 23 is a simple part preferably a flat plate having a central access opening 90 and a peripheral part in the form of a rim 91 which may carry a suitable tire 92. The rim and tire are concentric with the wheel section and the access opening 90 is made sufficiently large to enable the operator to conveniently reach the heads 38 of the bolts of means 25.

In using the structure that I have provided as above described the hub section 22 is applied to the hub assembly or hub unit 13 of the vehicle in the manner that I have described with the sections 22 and 23 eccentric to one another in order to allow the application to be made as shown in Figs. 1 and 4 of the drawings. With the auxiliary wheel thus applied it is merely necessary to drive or otherwise move the motor vehicle in a manner to roll in one direction or the other, preferably forward. As the vehicle is rolled forward the auxiliary wheel is moved through 90° to a position such as is shown in Fig. 2 during which movement the hub unit 13 is lifted the desired amount, clearing or relieving the tire 20. Further movement or continued movement of the vehicle will cause the sections 22 and 23 of the auxiliary wheel, by means of gravitational forces, to be brought to concentric position as there will be a tendency to further lift the unit 13 and the angle of the guide construction above described will become such as to cause movement of the sections 22 and 23, by means of gravity, from the eccentric position to the concentric position. When the concentric relationship is gained the latch comes into operation or engages, thus releasably setting the auxiliary wheel construction in position for normal operation as a wheel. The vehicle can then be operated in a reasonable manner to a point where a permanent repair can be made.

In the form of the invention shown in Fig. 11 I provide a means 70 for positively moving the section 22ª and 23ª from the eccentric position to the concentric position rather than depend on movement of the vehicle as above described. In this case a jack means or jack screw 71 is carried by one of the sections and threads into a nut 73 on the other section. In the case illustrated the jack screw is carried by a bracket 74 on the section 23ª and threads through a nut 73 on the section 22ª.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An auxiliary wheel for a vehicle including, two sections, one a hub section and the other a wheel section, guide means shiftably connecting the sections for relative movement between a position where the wheel section is eccentric of the hub section and a position where the two sections are concentric including spaced parallel guides, bolts connecting the hub section to the wheel and located between the guides, and means releasably holding the sections in the last named position, the wheel section having a single opening through which the several bolts are accessible.

2. An auxiliary wheel for use on a hub assembly which normally carries a vehicle wheel including, a substantially flat plate forming a hub section with parallel opposite marginal edges, means engaged with the hub section between the said marginal edges thereof for attaching said section to the hub assembly, a wheel section, means shiftably connecting the sections for relative movement between a position where the wheel section is eccentric of the hub section and a position where the two sections are concentric including parts on the wheel section engaging said edges of the hub section joining the sections together, and means releasably holding the sections in the last named position.

3. An auxiliary wheel for use on a hub assembly which normally carries a vehicle wheel including, a substantially flat rectangular hub section with opposite parallel guide edges, means between the guide edges attaching said section to the hub assembly with said guide edges projecting radially of the wheel, said means including tubular guides attached to the hub section and projecting laterally therefrom and mounting bolts carried by the tubular guides, a wheel section, means shiftably connecting the sections for relative movement between a position where the wheel section is eccentric of the hub section and a position where the two sections are concentric including guides on the wheel section engaging the said edges of the hub sections, and latch means releasably holding the sections in the last named position.

4. An auxiliary wheel for use on a hub assembly which normally carries a vehicle wheel including, a substantially flat rectangular plate forming a hub section with marginal edges in a plane radial of the wheel, bolts engageable with the vehicle wheel for attaching said section to the hub assembly, a substantially flat wheel section, elements on the wheel section slidably engaging said edges and shiftably connecting the sections for relative movement parallel with said edges between a position where the wheel section is eccentric of the hub section and a position where the two sections are concentric, and means releasably holding the sections in the last named position, the wheel section having a single opening through which the said bolts are accessible from the outer side of the wheel section.

5. An auxiliary wheel for a vehicle including, two sections, one a hub section and the other a wheel section, a plurality of bolts securing the hub section to the vehicle, guide means shiftably connecting the sections for relative movement between a position where the wheel section is eccentric of the hub section and a position where the two sections are concentric, the wheel section having a single opening through which the bolts are simultaneously accessible, and means remote from the guide means releasably holding the sections in the last named position including a spring pressed latch carried by one section cooperating with an edge of the wheel section defining said opening.

6. An auxiliary wheel for a vehicle including, two sections, one a hub section with spaced parallel guide parts and the other a wheel section with parallel opposed flanges engaging said edges, mounting bolts engaging the hub section accessible from the outer side thereof, the said flanges and edges shiftably connecting the sections for relative movement between a position where the wheel section is eccentric of the hub section and a position where the two sections are concentric, means stopping relative movement of the sections upon their being moved to the last named position, and means releasably holding the sections in the last named position, the wheel section having a single opening between the guide parts through which the bolts are always accessible.

7. An auxiliary wheel for use on a hub assembly which normally carries a vehicle wheel including, a substantially flat hub section with opposite guide edges tubular guides fixed to the hub section between the said edges and projecting laterally therefrom, bolts carried by the tubular guides for attaching said section to the hub assembly, a wheel section, flanges on the wheel section shiftably engaging said edges and connecting the sections against separation and for relative movement between a position where the wheel section is eccentric of the hub section and a position where the two sections are concentric, means stopping relative movement of the sections upon their being moved to the last named position, and means releasably holding the sections in the last named position.

8. An auxiliary wheel for use on a hub assembly which normally carries a vehicle wheel including, a substantially rectangular plate forming a hub section with opposite guide edges, bolts engaging the hub section between said edges for attaching said section to the hub assembly, a substantially flat plate forming a wheel section, means shiftably connecting the sections in substantially the same plane and for relative movement in such plane between a position where the wheel section is eccentric of the hub section and a position where the two sections are concentric including projections fixed on one side of the wheel section and having flange portions spaced from the wheel section with the said edges between the wheel section and the flanges, and means releasably holding the sections in the last named position.

9. An auxiliary wheel for use on a hub assembly which normally carries a vehicle wheel including, a hub section with parallel edges, means for attaching said section to the hub assembly including a plurality of spaced fastening devices carried by the hub section, a wheel section having a single opening providing access to said devices, means remote from the fastening devices shiftably connecting the sections together and for relative movement between a position where the wheel section is eccentric of the hub section and a position where the two sections are concentric, said last mentioned means including parallel parts on the wheel section slidably coupled with said edge portions of the hub section, and means releasably holding the sections in the last named position, each of said fastening devices including a guide carried by the hub section between the hub section and the vehicle wheel and a bolt carried by the guide for threaded engagement with the wheel.

EDWARD CRAIG.

REFERENCES CITED

The following references are of record in the file of this patent:

UNITED STATES PATENTS

| Number | Name | Date |
|---|---|---|
| 19,951 | Muller | June 20, 1912 |
| 1,526,060 | Geisendorfer | Feb. 10, 1925 |
| 1,846,448 | Nelson | Feb. 23, 1932 |
| 1,950,998 | Quinn | Mar. 13, 1934 |